A. HESS.
TOILET SEAT.
APPLICATION FILED FEB. 15, 1922.

1,436,168.

Patented Nov. 21, 1922.

INVENTOR.
Arthur Hess
BY
ATTORNEYS.

Patented Nov. 21, 1922.

1,436,168

UNITED STATES PATENT OFFICE.

ARTHUR HESS, OF LOS ANGELES, CALIFORNIA.

TOILET SEAT.

Application filed February 15, 1922. Serial No. 536,707.

*To all whom it may concern:*

Be it known that I, ARTHUR HESS, a citizen of the United States, and resident of Los Angeles, in the county of Los Angeles, State of California, have invented new and useful Improvements in a Toilet Seat, of which the following is a specification.

This invention relates to a closet seat, which is a built-up structure presenting in effect an integral seat. Closet seats are commonly constructed of wood. To prevent splitting and cracking of the seat, it is the usual practice to build up the seat of a number of sections fastened together by dowel pins, cement, and the like. Such a structure provides a light, strong seat having some resiliency.

It is the primary object of my invention to provide a seat built up of plastic material, such as vulcanized rubber. It is another object of this invention to provide a seat of this character which has a hollow core and is in effect integral.

Figure 1:
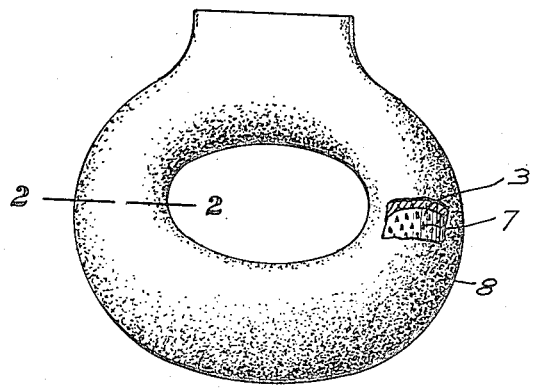
Figure 2:
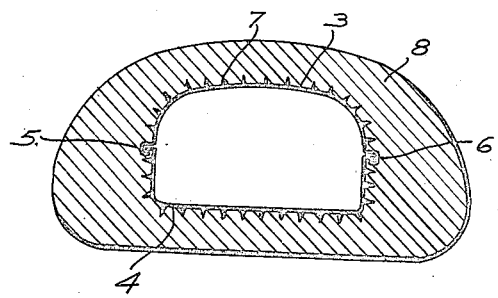

These objects together with other objects and corresponding accomplishments are obtained by means of the embodiment of my invention illustrated in the accompanying drawing, in which:

Fig. 1 is a perspective view from the front of a seat built up in accordance with my invention; and Fig. 2 is an enlarged vertical section as seen on the line 2—2 of Fig. 1.

The particular seat shown is for illustrative purposes only, and the inventive idea may be adapted to other styles of seats. Thus, open front seats, and saddle seats may be built up and embody the inventive idea hereafter disclosed. A hollow background or core for the plastic material is formed of sheet metal. This is preferably made of two sections 3 and 4. These sections may be united by crimped flanges 5 and 6. The form is preferably provided with teeth 7 punched from the metal. The teeth serve to anchor the vulcanized rubber which is molded about the form. The rubber is indicated generally by 8.

By means of the construction just described, a seat of vulcanized rubber is formed, this rubber being molded around a hollow form. An integral seat is thereby built up without joints and having no natural cleavage lines. Furthermore, the hollow core decreases the weight of the seat and adds to the resiliency thereof. The structure is such that a square back may be provided, as shown herein. Other forms or styles of backs may be provided, and the invention may be embodied in any of the well known styles of seats now on the market. It is obvious that the seat cover and other associated parts may be constructed in the same manner.

What I claim is:

A closet seat comprising a sheet metal core tubular in form and having teeth upset therefrom to form anchors, and vulcanizing material molded thereover and adhering to said teeth to form a hollow seat.

In witness that I claim the foregoing I have hereunto subscribed my name this 10th day of February, 1922.

ARTHUR HESS.